United States Patent
Liu et al.

(10) Patent No.: US 9,899,876 B2
(45) Date of Patent: Feb. 20, 2018

(54) MAXIMUM POWER OUTPUT CIRCUIT FOR AN EHC AND DESIGN METHOD THEREOF

(71) Applicant: Shanghai Jiao Tong University, Shanghai (CN)

(72) Inventors: Yadong Liu, Shanghai (CN); Chenlin Hu, Shanghai (CN); Xiaolei Xie, Shanghai (CN); Gehao Sheng, Shanghai (CN); Xiuchen Jiang, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 385 days.

(21) Appl. No.: 14/689,843

(22) Filed: Apr. 17, 2015

(65) Prior Publication Data
US 2016/0268812 A1    Sep. 15, 2016

(30) Foreign Application Priority Data
Mar. 13, 2015   (CN) .......................... 2015 1 0111209

(51) Int. Cl.
*H01F 27/42* (2006.01)
*H01F 37/00* (2006.01)
*H01F 38/00* (2006.01)
*H02J 50/10* (2016.01)
*H02J 11/00* (2006.01)

(52) U.S. Cl.
CPC .............. *H02J 50/10* (2016.02); *H02J 11/00* (2013.01)

(58) Field of Classification Search
USPC .................................................. 307/9.1, 104
See application file for complete search history.

(56) References Cited

U.S. PATENT DOCUMENTS

| | | | | |
|---|---|---|---|---|
| 5,770,982 A | * | 6/1998 | Moore | H01F 21/08 323/308 |
| 9,678,114 B2 | * | 6/2017 | Shamir | G01R 15/186 |
| 2011/0158806 A1 | * | 6/2011 | Arms | F03D 1/0658 416/31 |
| 2012/0032522 A1 | * | 2/2012 | Schatz | H02J 5/005 307/104 |
| 2012/0098509 A1 | * | 4/2012 | de Rochemont | H01F 17/062 323/282 |
| 2012/0235647 A1 | * | 9/2012 | Chung | G01P 15/11 322/3 |

(Continued)

OTHER PUBLICATIONS

Roscoe et al "Development of Magnetic Induction Energy Harvesting for Condition Monitoring" Proc. 44th Int. Univ. Power Eng. Conf., pp. 1-5. 2009.

(Continued)

*Primary Examiner* — Adam Houston
(74) *Attorney, Agent, or Firm* — Mei & Mark LLP; Manni Li

(57) ABSTRACT

A maximum power output circuit for EHC and its design method are presented. The circuit is comprised of a magnetic core, that is, a primary coil and a secondary coil, with a load resistor and a capacitor parallel connected at the two ends of the secondary coil. The circuit enables the EHC to be always working at the maximum power output, thus realizing maximum power output of the energy harvesting power source.

2 Claims, 6 Drawing Sheets

(56) References Cited

U.S. PATENT DOCUMENTS

| | | | |
|---|---|---|---|
| 2013/0099587 A1* | 4/2013 | Lou | H01F 38/14 |
| | | | 307/104 |
| 2015/0084440 A1* | 3/2015 | Erdmann | H01H 9/168 |
| | | | 310/12.12 |
| 2015/0094168 A1* | 4/2015 | Unger, Sr. | A63B 37/0003 |
| | | | 473/353 |
| 2016/0231361 A1* | 8/2016 | Shamir | G01R 15/186 |
| 2016/0268812 A1* | 9/2016 | Liu | H02J 50/10 |

OTHER PUBLICATIONS

Roscoe et al "A Novel Inductive Electromagnetic Energy Harvester for Condition Monitoring Sensors" Proc. Int. Conf. Condit. Monitor. Diagnosis, pp. 615-616. 2010.

Roscoe et al "Harvesting Energy from Magnetic Fields to Power Condition Monitoring Sensors" IEEE Sensors J. vol. 13, pp. 2263-2270, 2013.

* cited by examiner

MAXIMUM POWER OUTPUT CIRCUIT FOR AN EHC AND DESIGN METHOD THEREOF

CROSS-REFERENCE TO RELATED APPLICATIONS

This application claims the benefit of Chinese Application No. 201510111209.X, filed on Mar. 13, 2015, the content of which is hereby incorporated by reference in its entirety.

BACKGROUND OF THE INVENTION

Field of the Invention

The present invention relates to transmission line technology, and in particular relates to a maximum power output circuit for an EHC and a design method thereof.

Background Information

For real time monitoring of grid assets and effective reduction of grid faults, online grid monitoring systems are extensively developed at home and abroad. FIG. 1 shows the structure of such a system, where a monitoring device is directly installed on the power transmission line for monitoring of inclination angle, stress, conductor temperature and conductor current, the monitoring data thereof being transmitted wirelessly to a monitoring platform, which then accesses the status of the power transmission line with combined inputs of monitored parameters and running status of the transmission line. Practices in recent years show that power supply and communication are two bottlenecks impeding development of online monitoring solutions for power transmission lines.

Up to now, of mature harvesting solutions there are mostly solar energy, wind power, capacitive divider, laser supply, induction harvesting, differential temperature harvesting, and vibration harvesting. By comparison of the above-mentioned harvesting solutions, induction harvesting is believed to be the most suitable for transmission line energy harvesting. USI, OTLM, Hangzhou Thunderbird, and Xi'an Jinyuan have all developed commercial products based on induction harvesting. However, all the above products work on the range in excess of 50 A due to limited power supply, and hence are prevented from operating normally on most applications generally with a working current below 50 A.

For an online monitoring power source for power transmission line, it needs to be capable of adapting to big load swings in addition to posing no risk for the transmission line per se. Thus, an induction harvesting solution shall meet the following requirements for: ① large dynamic range; current over a power transmission line ranges from a peak current over 1000 A to a valley one of 40 A and even as low as 10 A for certain distribution networks; output power of an energy harvesting coil (hereunder abbreviated as EHC) is positively correlated with the current on the transmission line; as is shown on FIG. 2, the output power of the EHC needs to be regulated via practical means to consistently output a stable power within the wide dynamic range; ② high density per unit power; the weight of an online monitoring device is strictly regulated due to safety considerations, for example, the weight of a universal monitoring device is limited to 2.5 kg, that of a vibration monitoring is limited to 1 kg, and that for a distribution network monitoring device is limited to 500 g; therefore, the only way to solve the problem is to increase the power density of the energy harvester; and ③ anti-surge capability; a transmission line is subject to impact of short circuits or lightning, which might result in a peak current of several kA, so the induction harvester shall be able to withstand such current surges.

Foreign and domestic scholars focus their research mostly on two aspects, power output model and protection of the EHC. N. M. Roscoe, M. D. Judd, L. Fraser, "A novel inductive electromagnetic energy harvester for condition monitoring sensors," in Proc. Int. Conf. Condit. Monitor. Diagnosis, Sep. 2010, pp. 615-618, N. M. Roscoe, M. D. Judd, and J. Fitch, "Development of magnetic induction energy harvesting for condition monitoring," in Proc. 44th Int. Univ. Power Eng. Conf., September 2009, pp. 1-5, N. M. Roscoe, Judd M. D. Harvesting energy from magnetic fields to power condition monitoring sensors." IEEE Sensors J., vol. 13, no. 6, pp. 2263-2270, 2013, consider an EHC equivalent to a voltage source or a current source, with output power of the EHC reaching it maximum when load resistance is equal to internal resistance of the power source. In fact, output voltage of the EHC changes as the load current changes, and as the load of the EHC changes, its output voltage and current change simultaneously, and therefore the above assumption does not strictly hold.

SUMMARY OF THE INVENTION

The object of the present invention is to overcome the above deficiency of the prior art and to provide a maximum power output circuit for an EHC and a design method thereof. Said circuit enables the EHC to be always working at the maximum output power point, raises the maximum power density of the harvester, and realizes maximum power output of the harvester.

The technical solution of the present invention is as follows:

A maximum power output circuit for an EHC, characterized in that it is comprised of a magnetic core, that is, a primary coil (N1) and a secondary coil (N2), with a load resistor (R) and a capacitor (C) parallel connected at two ends of the secondary coil.

A design method for the above maximum power output circuit for the EHC, characterized in that the method comprises the following steps:

① setting a power density index $\lambda$ under a minimum working current;

② calculating a magnetization current $I_\mu$ under the minimum working current according to a maximum output power of the energy harvesting coil with the following formula:

$$I_\mu = \sqrt[k]{I_1/(C_1(k+1))}$$

where, $I_{Fe} = C_1 I_\mu^k$, $C_1$ is a transformation coefficient between the hysteresis loss current $I_{Fe}$ and the current $I_\mu$ parallel to a magnetic flux, and k is a transformation index between the hysteresis loss current $I_{Fe}$ and the current $I_\mu$ parallel to the magnetic flux, and $I_1$ is a primary current;

③ selecting a material for the magnetic core, and calculating an outer parameter $D_o$ and a thickness h in accordance with a density w and a volume V of the magnetic core by the following formula:

$$V = \pi(D_o^2 - D_i^2)h/4$$

$$V = W/w,$$

$$P_{max} = \mu h f \ln\frac{D_o}{D_i}\left(I_1\left(\frac{I_1}{C_1(k+1)}\right)^{\frac{1}{k}} - C_1\left(\frac{I_1}{C_1(k+1)}\right)^{\frac{k+1}{k}}\right)$$

where, V is the fixed volume of the magnetic core, $D_i$ is an inner diameter, W is a weight thereof, $P_{max}$ is a maximum output power, and f is a working frequency;

④ calculating, in accordance with the following formulas, a load resistance R and a capacitance C:

$$R = E_2/I_R \quad (13)$$

$$C = \frac{(I_\mu - I_1\cos\alpha)}{E_2 * 2\pi f * N_2} \quad (14)$$

where, $I_R$ is a current on the load resistor, E2 is an induction voltage of a secondary side of the energy harvesting coil, $N_2$ is a number of the secondary coil of the energy harvesting coil, µ is an effective permeability of the magnetic core, $I_\mu$ is the magnetization current, I1 is a primary current, f is a frequency of a power source, α is an angle between the primary current I1 and the magnetization current $I_\mu$, α=90 degrees.

The underlying principle of the present invention is:

1. CT Harvesting Model

For analysis of power output characteristics of an EHC, a diagram of a load equivalent model established for the EHC on the basis of the electro-magnetic induction theory is shown on FIG. 3.

Let the current flowing through the conductor line being $i_s$, the inner diameter of the EHC being $D_i$, its outer diameter being $D_o$, its width being h, its turns being $N_2$, then, the induction voltage $E_2$ on the secondary side of the EHC is:

$$E_2 = N_2\frac{\mu h}{2\pi}\ln\frac{D_o}{D_i}\frac{dI_\mu}{dt} \quad (1)$$

where, µ being the effective magnetic permeability of the magnetic core, $I_\mu$ being the magnetization current.

It follows from the magnetic potential balance equation that:

$$\dot{I}_1 N_1 + \dot{I}_2 N_2 = \dot{I}_m N_1 \quad (2)$$

where, $N_1$ being the number of the primary turns, and is set as 1 here, $N_2$ being the number of the secondary turns, $I_m$ being the exciting current.

Take into account of hysteresis loss, the exciting current $\dot{I}_m$ can be decomposed into a current $\dot{I}_\mu$ parallel to the magnetic flux and a hysteresis loss current $\dot{I}_{Fe}$ perpendicular to the magnetic flux, satisfying $$\dot{I}_\mu + \dot{I}_{Fe} = \dot{I}_m \quad (3)$$

By ignoring the primary and secondary magnetic flux leakage and the internal resistance of the coil, the vector diagram of the load model for the EHC is shown on FIG. 4.

Referring to FIG. 4, $\dot{I}_R$ being the resistive current component of the load, $\dot{I}_C$ being the capacitive current component of the load, and the following equations can be deduced from FIG. 4:

$$\dot{I}_1\sin\alpha - \dot{I}_R N_2 = \dot{I}_{Fe} \quad (4)$$

$$\dot{I}_1\cos\alpha + \dot{I}_C N_2 = \dot{I}_\mu \quad (5)$$

$$P' = (\dot{I}_1\sin\alpha - \dot{I}_{Fe})\frac{\mu h}{2\pi}\ln\frac{D_o}{D_i}\frac{d\dot{I}_\mu}{dt} = \mu h f\ln\frac{D_o}{D_i}I_\mu(I_1\sin\alpha - CI_\mu^k) \quad (6)$$

The core loss can be calculated according to the empirical Steinmetz formula:

$$P_v = C_m f^\alpha B^\beta \quad (7)$$

The core loss per volume Pv is an exponential function of alternating magnetizing frequency f and the peak flux density B. $C_m$, α, and β are empirical parameters, and the two exponents α and β are in the ranges of 1<a<3 and 2<β<3, where the work frequency f is fixed. Thus the core loss per volume is dependent only on the peak flux density B, and by regarding the core hysteresis resistance approximately as $R_m$, then $$P_v = R_m I_{Fe}^2 \quad (8)$$

Comparing expression (1) and (3), the hysteresis loss current $I_{Fe}$ can be expressed as:

$$I_{Fe} = C_1 I_\mu^k \quad (9)$$

where, $C_1$ is a transformation coefficient between the hysteresis loss current $I_{Fe}$ and the current $I_\mu$ parallel to the magnetic flux, and k is a transformation index between the hysteresis loss current $I_{Fe}$ and the current $I_\mu$ parallel to the magnetic flux. By substituting expression (9) in expression (6), the output power model of the EHC is:

$$P' = \mu h f \ln\frac{D_o}{D_i}I_\mu(I_1\sin\alpha - C_1 I_\mu^k) \quad (10)$$

It follows from expression (10) that α is an independent variable, the output power reaching its maximum when α=90 degrees, with $\dot{I}_\mu$ and $\dot{I}_1$ differing by 90 degrees at that point; it follows at the mean time that the load of the EHC is capacitive.

Thus the maximal condition for the output power is:

$$\frac{dP}{dI_\mu} = \mu h f \ln\frac{D_o}{D_i}(C_1(k+1)I_\mu^k - I_1) = 0 \quad (11)$$

From expression (11) the condition for maximum power output of the EHC is obtained as $$I_\mu = \sqrt[k]{I_1/(C_1(k+1))},$$

with the maximum power output being:

$$P_{max} = \mu h f \ln\frac{D_o}{D_i}\left(I_1\left(\frac{I_1}{C_1(k+1)}\right)^{\frac{1}{k}} - C_1\left(\frac{I_1}{C_1(k+1)}\right)^{\frac{k+1}{k}}\right) \quad (12)$$

Solve for $I_\mu$ from $C_1(k+1)I_\mu^k = I_1$, substitute it in expressions (4) and (5) to obtain the maximum power and the resistance and capacitance values at the maximum power point:

$$R = E_2/I_R \qquad (13)$$

$$C = \frac{(I_\mu - I_1 \cos\alpha)}{E_2 * 2\pi f * N2} \qquad (14)$$

with the annular magnetic core having a volume of:

$$V = \pi(D_o^2 - D_i^2)h/4 \qquad (15)$$

By defining the unit output power density A. as the ratio of the output power over the volume, it follows that:

$$\lambda \propto \ln\frac{D_o}{D_i} \Big/ (D_o^2 - D_i^2) \qquad (16)$$

It can be seen that by selecting the magnetic core material, fixing its volume, the is permeability, and the primary current, the power density is proportional to $$\ln\frac{D_o}{D_i} \Big/ (D_o^2 - D_i^2).$$

In comparison with prior art, the present invention is effective in that:

The present invention, by demonstrating both theoretically and experimentally the effects of the magnetic core shape and the number of secondary turns on the output power of the EHC, by establishes an output power model for the EHC based on the capacitance-resistance model, by more than doubling its unit power density, by further establishing power output characteristics for the harvester comprising the EHC and the power management module, and by enabling the EHC to be always working at the maximum power output point, realizes maximum power output for the EHC.

BRIEF DESCRIPTION OF THE DRAWINGS

The invention description below refers to the accompanying drawings, of which.

DETAILED DESCRIPTION

Figure 1:
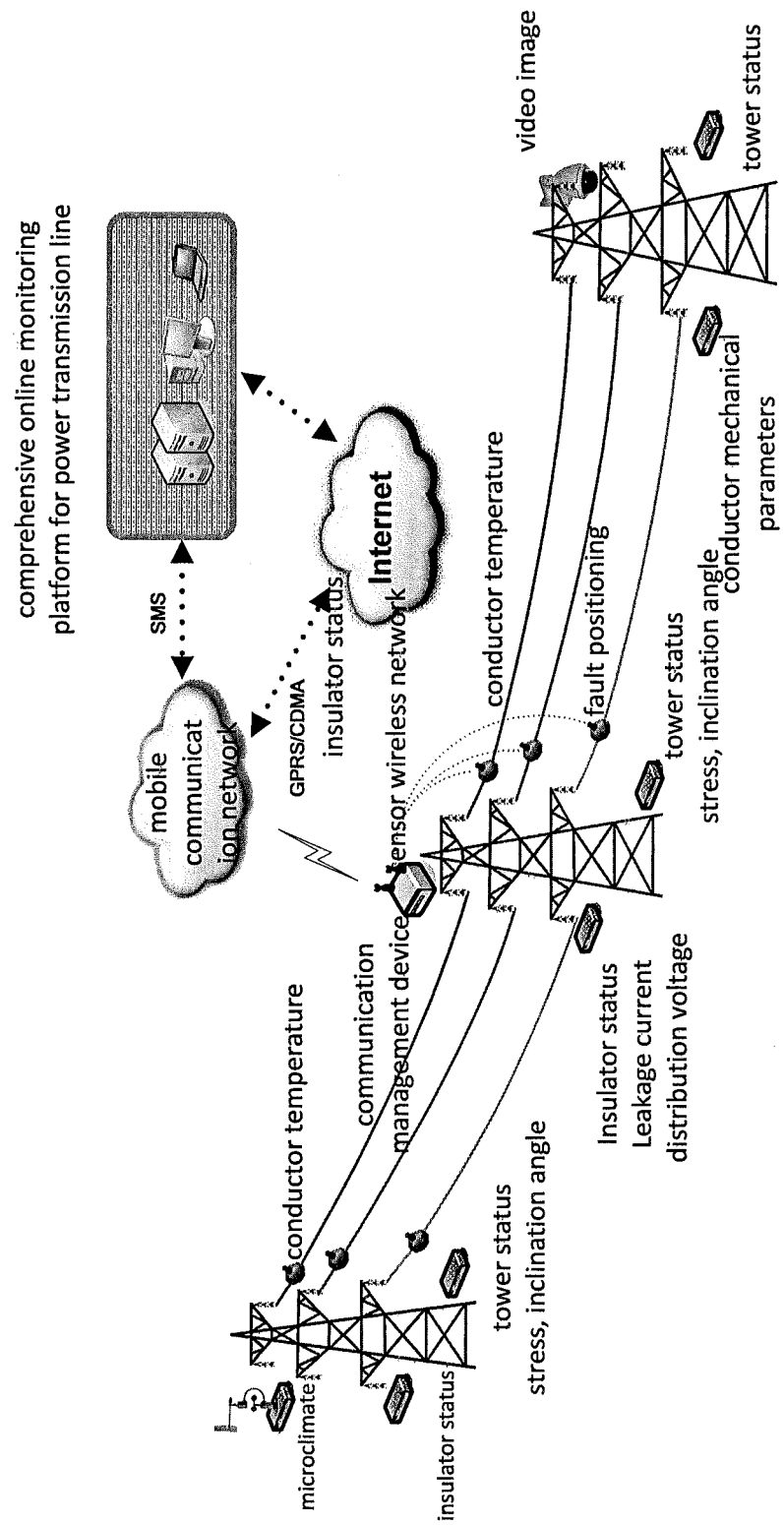
FIG. 1 is a schematic diagram of a prior art online monitoring system for a power transmission line.
Figure 2:
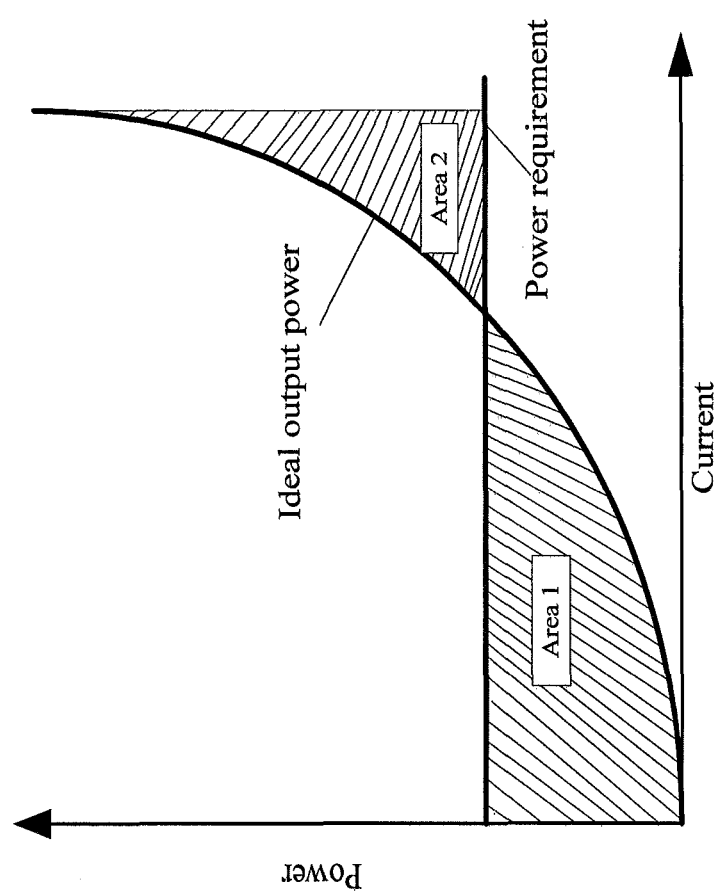
FIG. 2 exhibits a prior art method for controlling the output power of an EHC to be outputting a stable power output in a wide dynamic range.
Figure 3:
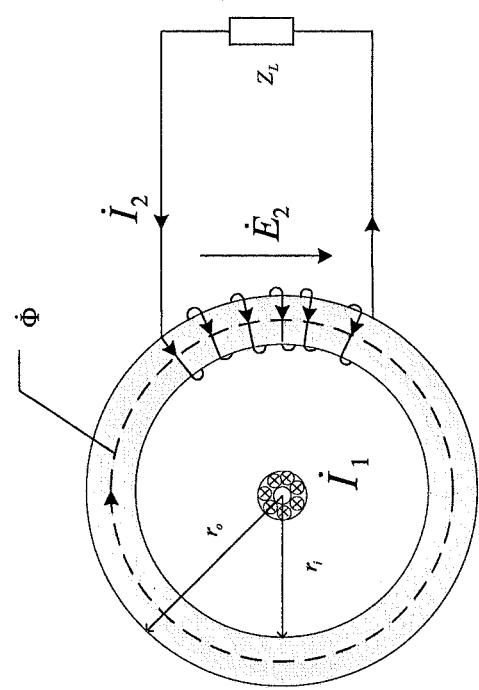
FIG. 3 is a schematic diagram of the equivalent load model of the EHC of the present invention.
Figure 4:
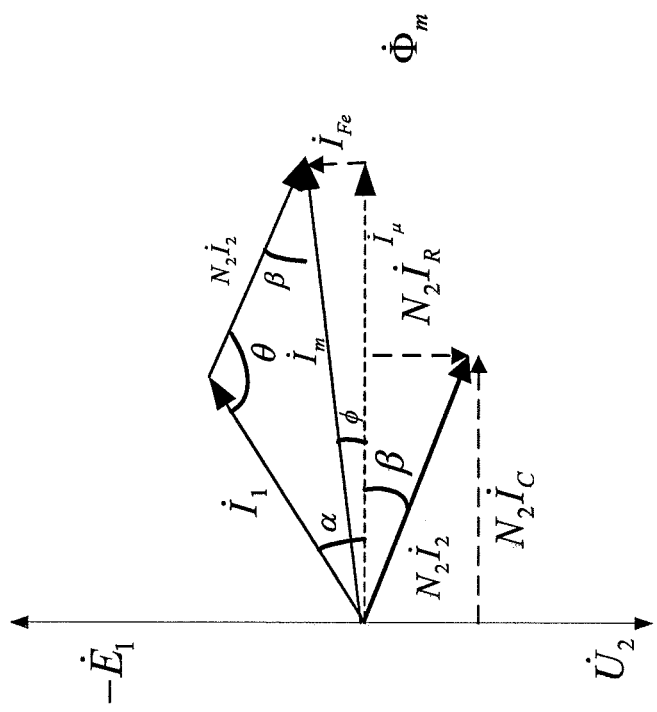
FIG. 4 is a vector diagram of the resistance-capacitance model by taking into account the hysteresis loss.

Referring to FIG. 3, a schematic diagram of the equivalent load model of the EHC of the present invention, it can be seen therefrom that the maximum power output circuit of the EHC of the present invention is comprised of a magnetic core, that is, a primary coil N1 and a secondary coil N2, with a load resistor R and a capacitor C parallel connected at the two ends of the secondary coil.

The design method for an embodiment of the maximum power output circuit of the EHC of the present invention comprises the following steps:

1) setting the power density λ of the magnetic core as 1.38 mW/g@10 A, that is, requiring the 1 kg magnetic core be capable of outputting 1380 mW power with a 10 A primary current;

2) selecting silicon steel as the material for the magnetic core of the embodiment, with a density of 7.35 g/cm$^3$, $C_1$ being 0.22, k being 0.95, the effective permeability being 0.01, $I_1$=10 A, and obtaining $I_\mu$ as 27.5 A according to $$I_\mu = \sqrt[k]{I_1/(C_1(k+1))};$$

substituting $I_\mu$ in $$P_{max} = \mu h f \ln\frac{D_o}{D_i}\left(I_1\left(\frac{I_1}{C_1(k+1)}\right)^{\frac{1}{k}} - C_1\left(\frac{I_1}{C_1(k+1)}\right)^{\frac{k+1}{k}}\right),$$

to obtain the maximum power output as $$67.02 * h\ln\frac{D_o}{D_i},$$

with the power density for the magnetic core being:

$$\lambda = 67.02 * h\ln\frac{D_o}{D_i} \Big/ (\pi(D_o^2 - D_i^2)h/4)$$

3) setting the inner diameter of the magnetic core Di as 55 mm, its weight as 450 g, with λ>1.2 mW/g, an calculation would show that $D_o$<75 mm The shape of the magnetic core shall be as $D_0$=75 mm, $D_i$=55 mm, h=30 mm,

4)

$$R = E_2/I_R \qquad (13)$$

$$C = \frac{(I_\mu - I_1\cos\alpha)}{E_2 * 2\pi f * N2} \qquad (14)$$

Calculations with expressions (13) and (14) will obtain C=17.1 uF, and R=1050 ohm.

| Parameters | Value |
| --- | --- |
| Density | 7.35 g/cm3 |
| Turns | 200 |
| μ | 0.01 |
| C1 | 0.22 |
| K | 0.95 |

Figure 5:
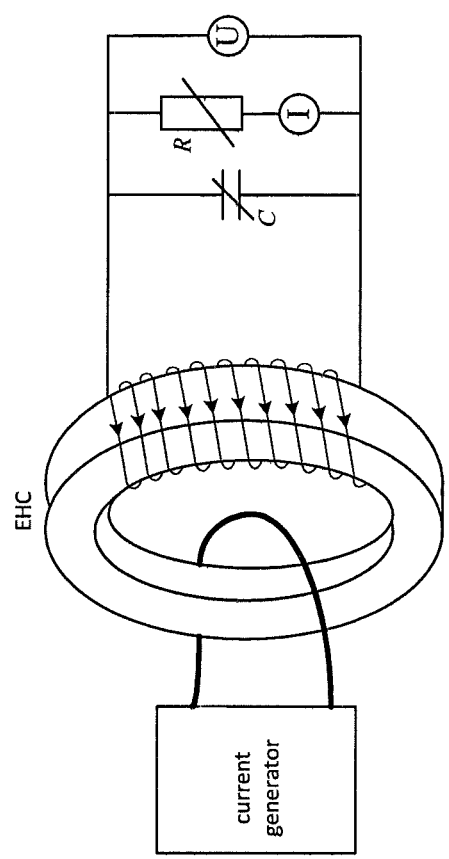
FIG. 5 is a schematic diagram of an embodiment of the maximum power output of the EHC of the present invention.
Figure 6:
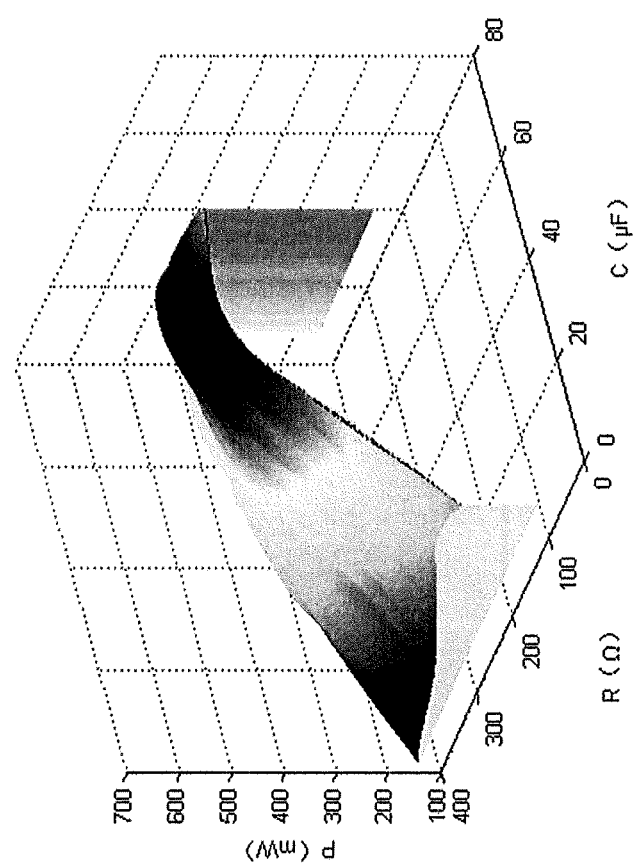
FIG. 6 shows a three dimensional display of a load resistance R of an embodiment of the maximum power output of the EHC of the present invention under dynamic adjustment of a sliding rheostat.

The experiment model is shown on FIG. 5. The current of the current generator is set as 10 A, the load capacitance C is increased in steps starting from 0 to 5 uF, the load resistor R is dynamically adjusted via a sliding rheostat, with the power output on the load resistor being displayed on FIG. 6, wherefrom it can be known that the maximum power output is 600 mW, conforming to theoretical calculation.

The invention claimed is:

1. A maximum power output circuit for an energy harvesting coil, comprising
a primary coil, the primary coil being a magnetic core having an outer parameter $D_0$, an inner diameter $D_i$, a width h, a density w, a weight W, an effective permeability $\mu$, a maximum power output $P_{max}$, and a fixed volume V,
a secondary coil, the secondary coil being wound around the primary coil with $N_2$ number of turns,
a load resistor having a resistance R, and
a capacitor having a capacitance C,
wherein the load resistor and the capacitor are separately parallel connected to two ends of the secondary coil;
the magnetic core has the fixed volume V being $$V = \pi(D_o^2 - D_i^2)h/4 \text{ and}$$

$$V = W/w, \text{ and}$$

$$P_{max} = \mu h f \ln\frac{D_o}{D_i}\left(I_1\left(\frac{I_1}{C_1(k+1)}\right)^{\frac{1}{k}} - C_1\left(\frac{I_1}{C_1(k+1)}\right)^{\frac{k+1}{k}}\right),$$

wherein f is a frequency of a power source, $I_1$ is a primary current, $C_1$ is a transformation coefficient between a hysteresis loss current $I_{Fe}$ and a current $I_\mu$ parallel to a magnetic flux, and k is a transformation index between the hysteresis loss current $I_{Fe}$ and the current $I_\mu$ parallel to the magnetic flux;
the load resistor has the resistance R being $$R = E_2/I_R,$$

wherein $E_2$ is an induction voltage of a secondary side of the energy harvesting coil, and $I_R$ is a current on the load resistor; and
the capacitor has the capacitance C being $$C = \frac{(I_\mu - I_1\cos\alpha)}{E_2 * 2\pi f * N_2},$$

wherein $\alpha$ is an angle of 90 degrees between the primary current $I_1$ and the magnetization current $I_\mu$.

2. A method for designing the maximum power output circuit for the energy harvesting coil of claim 1, comprising
setting a power density index $\lambda$ under a minimum working current;
calculating the magnetization current $I_\mu$, under the minimum working current according to a maximum output power of the energy harvesting coil as follows:

$$I_\mu = \sqrt[k]{I_1/(C_1(k+1))}$$

and $$I_{Fe} = C_1 I_\mu^k,$$

selecting a material for the magnetic core and calculating the outer parameter $D_o$ and the width h in accordance with the density w and the volume V of the magnetic core
calculating the resistance R and selecting the load resistor having the resistance R; and
calculating the capacitance C and selecting the capacitor having the capacitance C.

* * * * *